INVENTOR.
William R. Brennan
BY
ATTORNEY

INVENTOR.
William R. Brennan
BY
Charles C. Huggett
ATTORNEY

INVENTOR.
William R. Brennan
BY Charles A. Huggett
ATTORNEY

United States Patent Office 3,049,380
Patented Aug. 14, 1962

3,049,380
PRESSURE CONTROL
William R. Brennan, Stamford, Conn., assignor to Socony Mobil Oil Company, Inc., a corporation of New York
Filed Dec. 8, 1959, Ser. No. 858,110
11 Claims. (Cl. 302—53)

This invention relates to instrumentation for direct measurement of the amplitude of the fluctuation of pressure in a process zone as a continuous function and to make control of this amplitude possible. It is particularly applicable to the control of a pneumatic lift used to elevate granular catalyst in a stream of rapidly rising lift gas for recycle in the moving bed hydrocarbon conversion processes.

Various processes, such as cracking, reforming, coking, desulfurization, etc. use a granular contact material or catalyst with the hydrocarbons being brought into contact with the catalyst under pressure and temperature conditions found to permit efficient conversion of the hydrocarbons to more desirable products. The TCC process is the most widely used moving bed process and recent TCC units have utilized a pneumatic lift for elevation of the granular contact material. This invention will, therefore, be described with respect to its application in the TCC process. It will, of course, be appreciated that the invention finds application in a variety of processes and is not limited solely to the TCC process.

In the TCC process the catalyst is gravitated as a continuous column from the lift hopper, through an elongated vertical feed leg into an advanced pressure reactor, from the bottom of the reactor downwardly through a kiln and from the bottom of the kiln to a lift pot. The particles are then propelled in a rapidly moving stream of lift gas, usually air, from the lift pot through a lift pipe to the elevated lift separator. The particles travel in dispersed form, accelerate rapidly in the lower portion of the lift pipe to a maximum velocity and then gradually drop in velocity to a desired low discharge velocity. The pipe is usually tapered to accomplish the proper velocity control.

The critical features of catalyst velocity control in the lift have been developed and are described now in the patent literature. It is sufficient for this application to state that there is a minimum pressure drop across the lift for any given set of conditions which produces minimum attrition and that this point can be found by reducing the total air to the lift until the pressure drop across the lift reaches a minimum and commences to increase with further gas reduction. While these facts are well known now, it is difficult to continuously maintain a pneumatic lift in operation at the point of minimum attrition because of slight changes in gas flow, temperature, pressure, etc. which occur in the process. The lift tends to drift from the point of minimum attrition and any movement from this point results in undesirable increase in attrition. Unfortunately, this drift is difficult to recognize and unnecessary catalyst damage occurs long before the shift can be recognized.

This invention is based on the observation that the fluctuation of a main variable, such as the pressure in a pneumatic lift pipe, is often a better indication of the stability of the operating conditions than the main variable itself. When upsets are beginning to take place, the fluctuation of the main variable often increases before the absolute value of the variable starts to change appreciably. Also, the ratio of fluctuation of the main variable to the value of the main variable is often so small that it does not even appear on the recorder or indicators used to measure the main variable. This is decidedly unfortunate since the detection of the fluctuation of the main variable, such as, for instance, the fluctuation of pressure in a pneumatic lift, would give a warning in case of an approaching upset in lift conditions and hence correction could be made before any real damage took place. Detection through the main variable, such as the pressure in the lift pipe, is possible but often too slow to give a warning and the upset in operating conditions is so advanced when detected by observation of the main variable that damage has been done to the process and a loss has already been suffered. As an example, in a pneumatic lift operation elevating granular catalyst in a TCC system, an increase of the pressure in the lift pipe of 25 percent means that the operation has gone into an undesirable surging condition. The corresponding increase of the fluctuation in pressure is 50 percent and hence it is seen that the pressure fluctuation is a far more sensitive indicator than the pressure itself.

The object of this invention is to provide a method and means of measuring the average amplitude of fluctuation of pressure in a process to permit this average amplitude to be used for control purposes.

This object will become obvious from the following detailed description of the invention to be read in conjunction with the attached figures.

In one important aspect the invention involves the conversion of a fluctuating pressure from a process zone to a voltage of fluctuating magnitude. This voltage is amplified and rectified and the high and low voltage peaks are measured by means of a fluctuation detector. The output of the detector is converted to a standard electrical signal whose magnitude is a measure of fluctuation amplitude so that this differential signal can be read directly and used to effect control of the operation of the process. This invention will now be described in detail, first by a discussion of the TCC process where the invention is used to control the operation of the pneumatic lift at maximum efficiency operation with minimum attrition.

Figure 1:
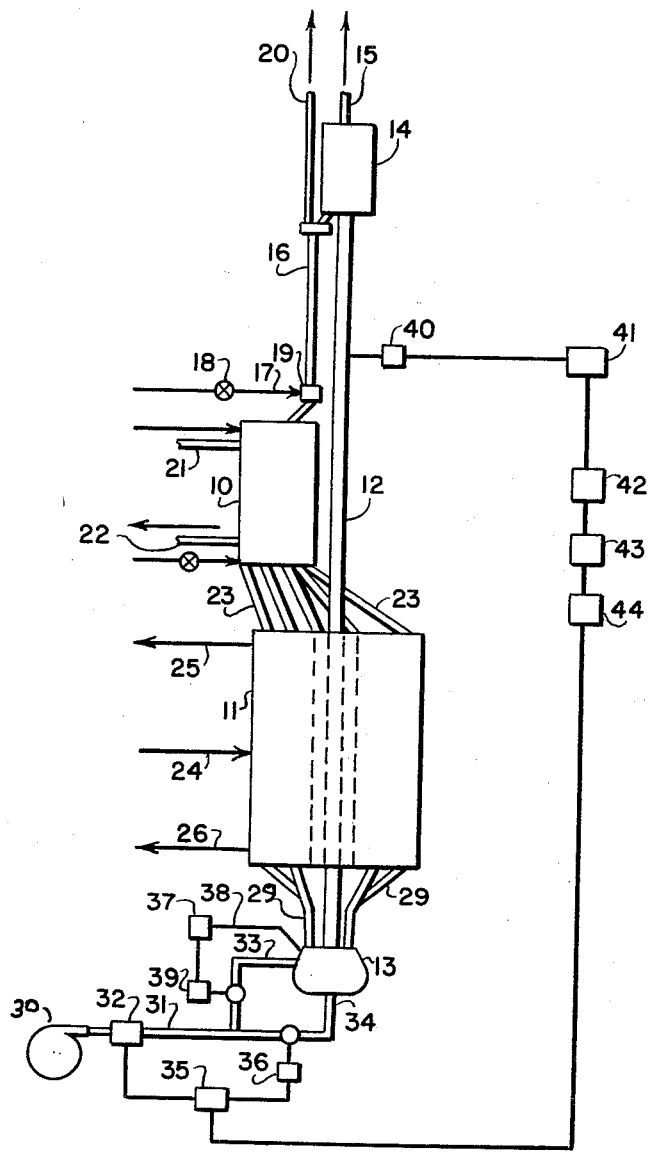
FIGURE 1 is a diagrammatic representation of a TCC system with the apparatus of the invention incorporated for lift control purposes.

Referring now to FIGURE 1, a diagrammatic showing of a TCC system, a reactor 10 is shown in superimposed position with a kiln 11 of annular cross-section through which is located a vertically extending pneumatic lift pipe 12. At the base of the lift pipe is located a lift pot 13 and associated gas apparatus for elevating the catalyst in dilute phase form through the lift pipe 12 to a separator 14. The gas and catalyst separate in the separator 14, the gas being discharged to the atmosphere through the pipe 15, the catalyst settling to the base of the separator 14 to form a compact gravity flowing mass. Catalyst is withdrawn from the bottom of separator 14 through an elongated gravity feed leg 16 into the reactor 10 which is maintained under advanced pressure and temperature. A seal gas such as steam or flue gas is introduced into the lower section of the gravity feed leg through a conduit 17 controlled by the valve 18 by means of a suitable feed pot 19. This gas is introduced at slightly higher than reactor pressure so that some gas will flow downwardly with the catalyst into the reactor to prevent the escape of reactants from the reactor. The remainder of the seal gas flows upwardly through the seal leg countercurrently with the catalyst and escapes to the atmosphere through the vent pipe 20. Suitably prepared hydrocarbon reactants are introduced into the reactor 10 through the conduit 21 and travel concurrently with the catalyst and through the void spaces in the bed to the lower section of the vessel. The conditions are maintained so that a substantial amount of the reactants are cracked in the presence of the catalyst to provide an increased amount of high octane motor fuel. The reaction products are withdrawn from the catalyst through the conduit 22 and pass through suitable processing apparatus not shown. During the cracking reaction a carbonaceous deposit is formed on the catalyst and the spent catalyst is withdrawn continuously from the bottom of the reaction vessel 10 through the multiplicity of conduits 23 and transferred to the top of the kiln 11. Air is introduced into the gravitating bed of catalyst in the kiln 11 through the conduit 24. A portion of the air travels upwardly through the bed to burn a portion of the contaminant on the catalyst, the flue gas being discharged to the atmosphere through the conduit 25 located near the top of the vessel. The remainder of the air travels downwardly through the catalyst bed to complete the combustion of the contaminant, the flue gas being discharged to the atmosphere through the conduit 26. The regenerated and reheated catalyst is withdrawn from the bottom of the kiln through the conduits 29 and introduced into the lift pot 13. It is seen that the catalyst travels as a continuous compact gravitating stream from the hopper 14 downwardly through the various vessels to the lift pot 13. The speed of gravitation of the catalyst is controlled by the rate of removal of catalyst from the lift pot 13 through the lift pipe.

A blower 30 is used to provide air under a modest pressure of, for example, 5 to 10 p.s.i.g. or less to the lift. The air travels to the conduit 31, the flow being measured by the meter 32. This air stream is then split into a secondary stream 33, which is introduced into the catalyst bed around the lower end of the lift pipe and is used to control the flow of catalyst into the lift pipe. The remainder of the lift gas is passed through the conduit 34 which projects upwardly into the bottom of the lift pipe and introduces this air stream into the lift pipe without passing through any substantial thickness of catalyst bed in the lift pot 13. By this expedient the total flow of air can be controlled independent of the flow of catalyst. The flow measuring instrument 32 is connected to controller 35 which operates automatic valves 36 in line 34 to maintain the total flow rate of air to the lift substantially constant. A controller 37 is connected to the top of the lift pot 13 by the conduit 38 and the controller operates an automatic valve 39 so as to maintain the pressure in the upper portion of the lift pot substantially constant, thereby maintaining substantially constant catalyst flow.

It has been discovered that for minimum attrition in the pneumatic lift the velocity conditions of the catalyst must be carefully controlled. A rapid acceleration is desirable in the lower portion of the lift up to a maximum critical velocity, at which point the catalyst must then be gradually reduced in upward velocity to a critical discharge velocity. Slight changes in velocity pattern of the catalyst in the lift will cause substantial change in efficiency of operation of the lift and damage to the catalyst from an increased attrition rate. These facts have been discussed fully and completely disclosed in Patent Number 2,819,921, issued January 7, 1958. The patent teaches that for control of a lift of this type so as to provide minimum attrition in the lift, the gas flow through the lift must be controlled to maintain a pressure fluctuation in the upper portion of the lift at a fixed ratio of the pressure fluctuation at the bottom of the lift. This invention provides a method and means for automatically reading or controlling the lift as a result of such reading of the pressure fluctuation in the upper portion of the pneumatic lift. While the invention was made to solve this specific problem, it of course has broader application and can be used in many other circumstances where a measure of pressure fluctuation is a valuable indicator.

Figure 2:
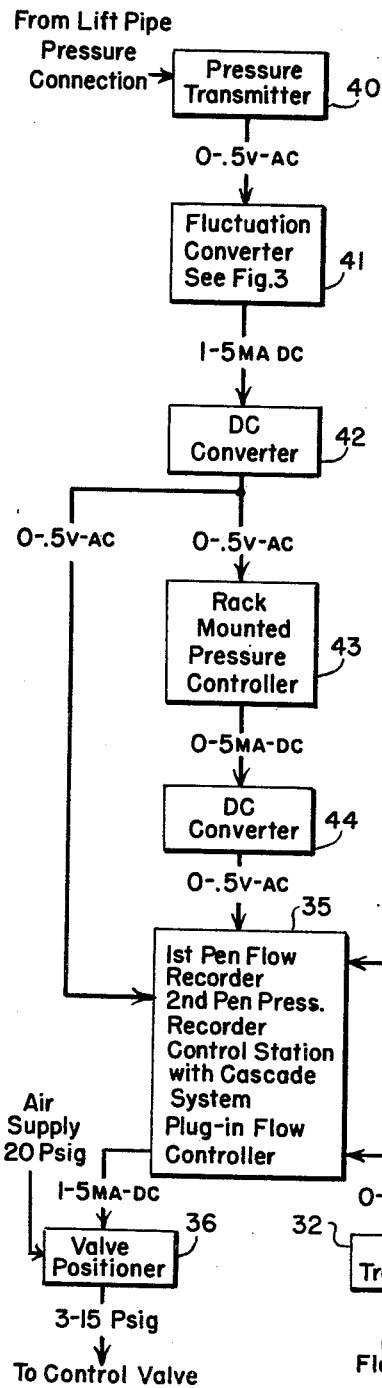
FIGURE 2 is a diagrammatic representation of the instruments used in the TCC lift air control system.

Referring now to FIGURE 2, there is shown a block diagram of a lift air control loop with pressure fluctuation resetting automatically the primary lift air flow. Each block shown on the figure represents widely-used, readily-available commercial instruments, with the exception of block 41, which is hereinafter disclosed in detail. The commercially available instruments will not be described here in detail as they are well known to workers in this field and can be obtained in a variety of forms. Item 40 represents a pressure transmitter for converting gas pressure to an electric signal, such as the instrument manufactured by Swartwout as the Swartwout Autotronic Model No. D2T transmitter with a range of 0 to 20 inches of water and an output of 0 to 0.5 volts A.C. Item 42 represents a D.C. to A.C. converter with an input of about 1 to 5 milliamperes D.C. and an output of about 0 to 0.5 volt A.C. A suitable converter is the Swartwout Autotronic Model No. D2C converter. Item 43 represents a pressure controller used to apply electric control to a pressure system. A suitable instrument is the Swartwout Autotronic Model No. A8C/6 controller with adjustable wide proportional band and standard automatic reset with provision for an adjustable ratio of the controller output from 1:1 to 25:1. Item 44 is a D.C. converter similar to item 42. Item 35 is a flow recorder controller. The Swartwout Autotronic Model No. A7R is illustrative of the type intended, being a 2 pen recorder control station with provision for cascade connection and M23F plug in controller with proportional band of 0–200% and automatic reset. Item 32 is a flow transmitter similar to item 40. Item 36 is a valve positioner, such as Fisher Model No. 3541, with an input of 1 to 5 milliamperes D.C. and an output of 3 to 15 p.s.i.g.

Figure 3:
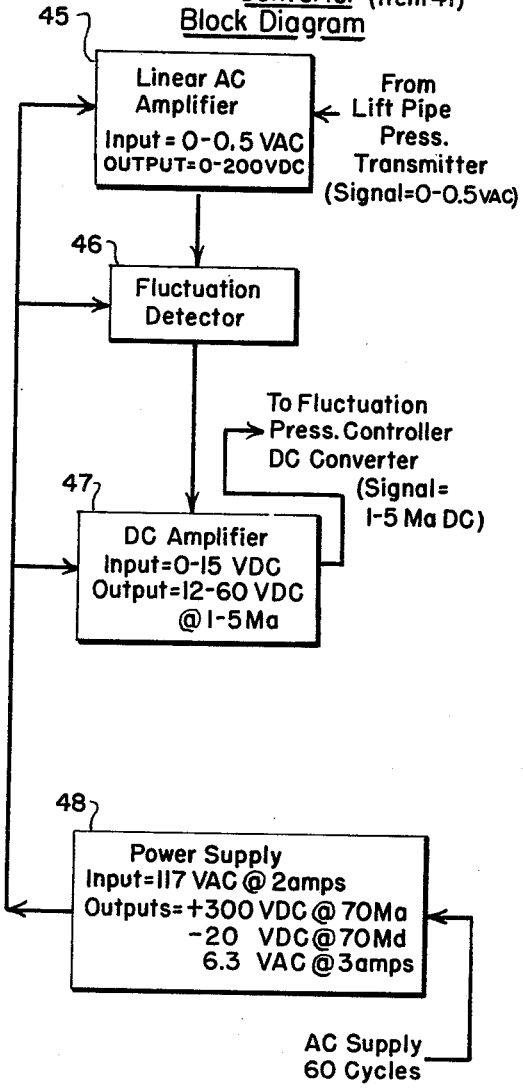
FIGURE 3 is a block diagram representation of the fluctuation conversion apparatus of this invention.
Figure 4:
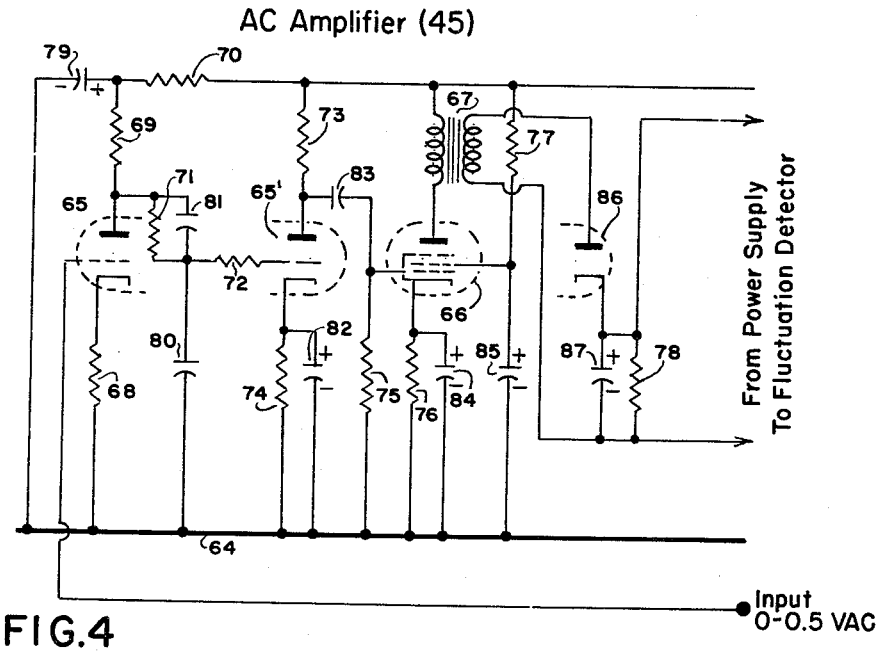
FIGURE 4 is the electronic circuit diagram of the linear A.C. amplifier of FIGURE 3.
Figure 5:
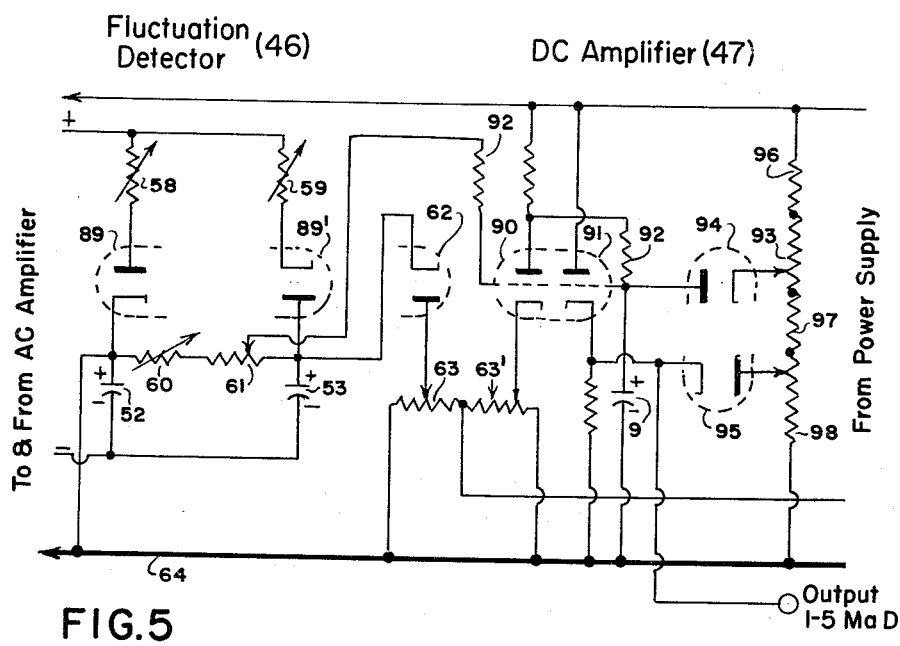
FIGURE 5 is the electronic circuit diagram of the fluctuation detector and D.C. amplifier of FIGURE 3.
Figure 6:
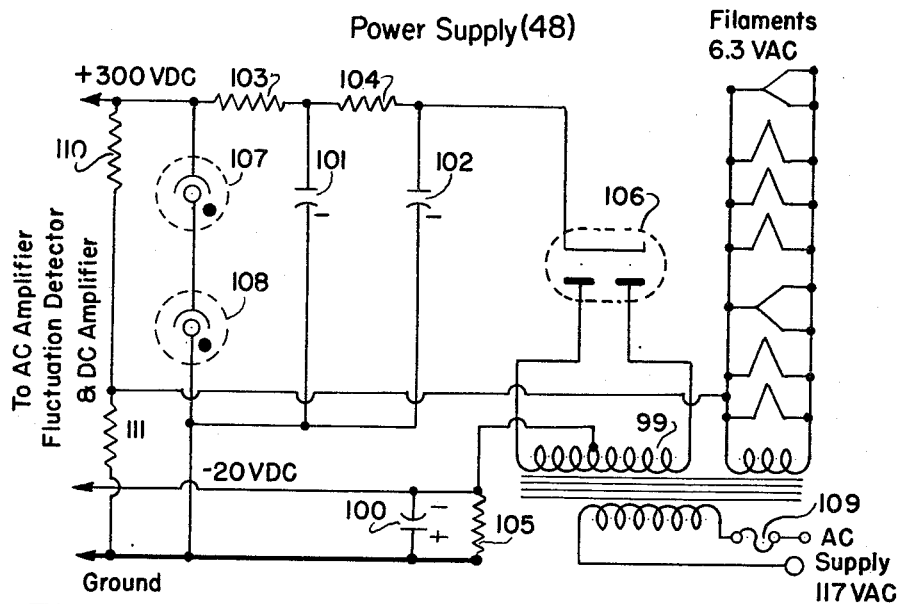
FIGURE 6 is the electronic circuit diagram of the power supply of FIGURE 3.

Referring now to FIGURE 3, there are shown four blocks numbered 45, 46, 47 and 48. Item 45 represents an A.C. linear voltage amplifier with an input of 0 to 0.5 volt A.C. and an output of 0 to 200 volts D.C. A detailed circuit diagram is shown on FIGURE 4. This amplifier is a modified standard component commercially available from the Swartwout Company as Model No. C4A A.C. amplifier, and will not be described here in detail. This amplifier has the ability to increase with stability the 0 to 0.5 volt A.C. output of the lift pipe pressure transmitter to 0 to 200 volts D.C. Item 46 shows a fluctuation detector which is not commercially available and therefore will be described in detail hereinafter. Item 47 shows a D.C. amplifier whose purpose is to amplify the output of the fluctuation detector into a standard output signal commercially used. Item 48 shows a D.C. power supply which is described in the circuit diagram. This is also a standard component commercially available, and will not be described in detail. Circuit diagrams of items 45, 46, 47 and 48 are illustrated in FIGURES 4, 5 and 6. The fluctuation of pressure in the lift pipe is first converted to a fluctuating voltage by means of the pressure transmitter.

For control purposes it is highly desirable to have the fluctuation of voltage indicated as a substantially constant value between maximum and minimum limits. The fluctuation detector shown in FIGURE 7 and described below accomplishes this result. Details 50 and 51 represent two diodes having the property of passing a flowing current in only one direction which permits their use as unidirectional devices. Details 52 and 53 represent two capacitors having the ability to store energy. These capacitors are used as memory units. Detail 54 is a high value resistor used to restrict the flow of current. Detail 55 is a very high resistance D.C. voltmeter which reads the voltage differential between capacitors 52 and 53.

A D.C. voltage fluctuating between 100 and 110 volts at the rate of 3 cycles per minute, representing the pressure fluctuation of the lift pipe, is applied between the leads 56, 57. The current flows through the diode 50 which is conducting in the direction of the arrow to capacitor 52. The positive end of capacitor 52 is connected to diode 50. Capacitor 52 quickly charges to the maximum potential applied between 56 and 57 or 110 volts. As this voltage reduces to 100 volts, diode 50 prevents the stored energy in capacitor 52 from leaking back. Diode 51 is also connected in series with capacitor 53 between the leads 56 and 57, but conducting in the opposite direction to diode 50, so that no current flows to capacitor 53. By this arrangement the maximum voltage applied between leads 56, 57 or 110 volts will be maintained in capacitor 52 whereas the minimum voltage, such as 100 volts, will be maintained in capacitor 53. The capacitor 53 receives its initial charge through a slow and gradual bleed on through diode 50 and resistor 54. A balancing or drain-off resistor 54 is provided to maintain a very restricted flow of current between capacitors 52 and 53. It is apparent that without such a bleed, capacitor 52 would maintain a voltage equal to the highest voltage which had occurred in the process at some earlier time, and likewise capacitor 53 would maintain a voltage equal to the lowest voltage which had occurred in the process at an earlier time. The device would then not be indicating the present differential between the maximum and minimum voltage and would, in effect, be inoperative. The slight flow of current between capacitor 52 and capacitor 53 through resistor 54 relieves these high and low voltages, as time passes, to a level where the present voltage levels existing in the process, passing through the diodes 50 and 51, will determine the voltage in capacitors 52 and 53. This flow of current can be made so small that it will normally have no substantial immediate effect upon the voltage differential maintained between capacitor 52 and capacitor 53. A very high resistance D.C. voltmeter drawing virtually no current is connected between the positive ends of capacitors 52 and 53. This substantially constant voltage differential, being a measure of amplitude of voltage fluctuation and representing the pressure fluctuation in the process, is indicated by the voltmeter, which provides a substantially uniform reading. Alternatively, this voltage differential can be used to operate known apparatus for adjusting conditions in the lift pipe to maintain the pressure fluctuation substantially constant.

Figure 7:
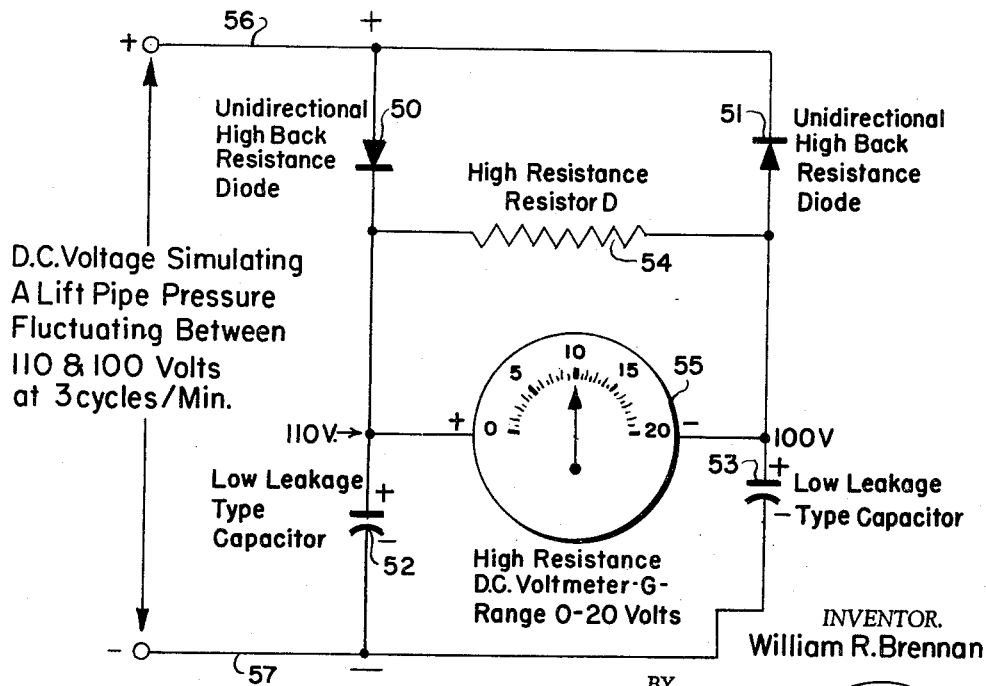
FIGURE 7 is a simplified electronic diagram of the fluctuation detector of FIGURE 3.

FIGURE 5 shows an improved modification of the apparatus shown in FIGURE 7, adapted for use in conjunction with other instruments as shown on FIGURES 1, 2 and 3 to control the pressure in a TCC lift pipe. In this embodiment two adjustable resistors 58, 59 have been added to dampen and limit the effect of any small and short duration high or low variations in fluctuation voltage. The balancing resistor 55 has been replaced by two adjustable resistors 60, 61. Resistor 60, which gives an adjustment for the current flow between the two capacitors 52 and 53, and resistor 61 are used as a range adjustment. The voltmeter 55 has been replaced by a D.C. amplifier, also illustrated on FIGURE 5, which is connected as an electronic voltmeter, its indicating device being a recorder connected to the fluctuation converter, as shown on FIGURE 2, block 35. The advantage obtained with this type of metering is that a low, weak signal can be converted into a strong standard output signal of 1 to 5 milliamperes D.C. while drawing practically no current from the fluctuation detector (which might cause measuring errors). Connected to the positive end of capacitor 53 is an underride unit, whose purpose is to keep the voltage differential between capacitors 52 and 53 within the limit of the detector range. This underride unit consists of diode 62 and adjustable resistor 63. Resistor 63 is set, so that a voltage which equals the desired full range voltage obtained between capacitors 52 and 53 is applied to the plate of diode 62. If the voltage between capacitors 52 and 53 increases to a level which is greater than that of the plate of diode 62 a current will flow from resistor 63 through diode 62 and hold the voltage between capacitors 52 and 53 within the present limits. It is to be noted that the leads 56 and 57 (the A.C. amplifier output lines as shown on FIGURE 4) and also the input leads of the fluctuation detector (FIGURE 5) have been kept isolated from the ground line 64. This is required because the positive end of capacitor 52 is directly connected to the ground.

Referring now to FIGURE 4, a diagram of an A.C. amplifier, tubes 65, 65', 66, transformer 67, resistors 68—78 and capacitors 79—85 constitute a three stage resistance capacitor coupled A.C. amplifier, designed to amplify with stability an A.C. input signal of 0–0.5 volt to a maximum output signal of 0–200 volts A.C. This output signal from transformer 67 is then rectified through the half-wave rectifier unit diode 86, capacitor 87 and resistor 88. This D.C. output voltage is then sent to (see FIGURE 5, fluctuation detector and D.C. amplifier) tube 89—89', which, together with capacitors 52, 53, resistors 58, 59, 60 and 61, constitute a voltage fluctuation detector. Capacitor 52 acts as a high and capacitor 53 acts as a low peak voltage memory, resistors 58 and 59 as small high speed input voltage variation dampeners and resistors 60 and 61, connected in series, as adjusting balancing (or drain off) resistors. Resistor 61 is also used as a range adjustment. The triode 90—91 is used as a D.C. amplifier, where resistor 92 is controlling the amount of current drawn from the detector by tube 90. Diode 62 and resistor 63 provide a high limit for the fluctuation detector, resistor 63' is used to set the output of the fluctuation converter at say 12 volts for 1 milliampere D.C. When a steady voltage at any level within the input range is fed to the unit the setting is called the zero adjustment. Triode 91 is connected as a cathode follower output amplifier where resistor 92 controls the amount of current being drawn. Capacitor 9 is a fluctuation dampener; resistor 93 prevents the cathodes of tubes 91 and 94 from being disconnected from ground in the event that tube 91 output is accidentally left disconnected. Diodes 94 and 95, resistors 96, 93, 97 and 98 form a voltage divider which permits keeping adjustable high and low limits on tube 91 output.

FIGURE 6, the power supply, shows transformer 99, capacitors 100, 101 and 102, resistors 103, 104 and 105, rectifier tube 106, voltage regulator tubes 107 and 108 and fuse 109 constituting a filament and regulated positive and negative D.C. power supply for this converter. Resistors 110 and 111 form a voltage divider whose purpose is to keep the filament voltage at approximately 12 volts positive with respect to the ground.

*Description of Reduction to Practice*

The method and equipment described herein were used to control a pneumatic lift elevating granular catalyst by means of an air stream. This lift had the following characteristics:

| | |
|---|---:|
| Lift pipe height_____feet__ | 115 |
| Lift pipe bottom diameter_____inches__ | 29.2 |
| Lift pipe top diameter_____do____ | 36.25 |
| Nominal catalyst flow rate_____t./hr__ | 400 |
| Pressure transmitter input range_____p.s.i.g__ | 0 to 1 |
| Pressure transmitter output range__volt-A.C.__ | 0 to 0.5 |

The apparatus was operated at optimum conditions for minimum attrition, and also at conditions of too high and too low lift air rates, both of which give excessive catalyst attrition. The following characteristics of operation for the apparatus of this invention were obtained:

| Lift air rate, percent of optimum | 110 High velocity | 100 Optimum | 95 Surging |
|---|---|---|---|
| Average pressure, 82 ft. elevation in lift pipe, inches of water. | 6.4 | 10.5 | 13.5. |
| Percent change from optimum. | 40 | | 30. |
| Average fluctuation pressure, 82 ft. elevation in lift pipe, inches of water. | 2.2 | 4.4 | 6.7. |
| Percent change from optimum. | 50 | | 50. |
| Fluctuation converter average output in volts D.C. Converter range 0-10" H₂O with an output of 12 to 60 v. D.C. | 22.5 v. D.C. at 1.87 ma. | 33.1 v. D.C. at 2.75 ma. | 44.2 v. D.C. at 3.68 ma. |

It can readily be seen that the pressure fluctuation is more sensitive to slight changes in operation than is the pressure itself, and that the fluctuating pressure, after being converted and amplified into a usable electrical D.C. signal respectively by the pressure transmitter and the A.C. amplifier, was converted into separate high and low D.C. voltages which were proportional to the amplitude of fluctuation pressure. The difference between high and low voltages has successfully been used in conjunction with a D.C. amplifier and other known apparatus, such as described in U.S. Patent No. 2,819,121, for adjusting the lift air rate to maintain optimum conditions. The apparatus can also be used to operate the lift at any particular level of attrition where this may be desirable. It is necessary in some instances to maintain a certain level of attrition to effect removal of contaminating metals from the surface of the catalyst. This acts to restore the catalyst.

Figure 8:
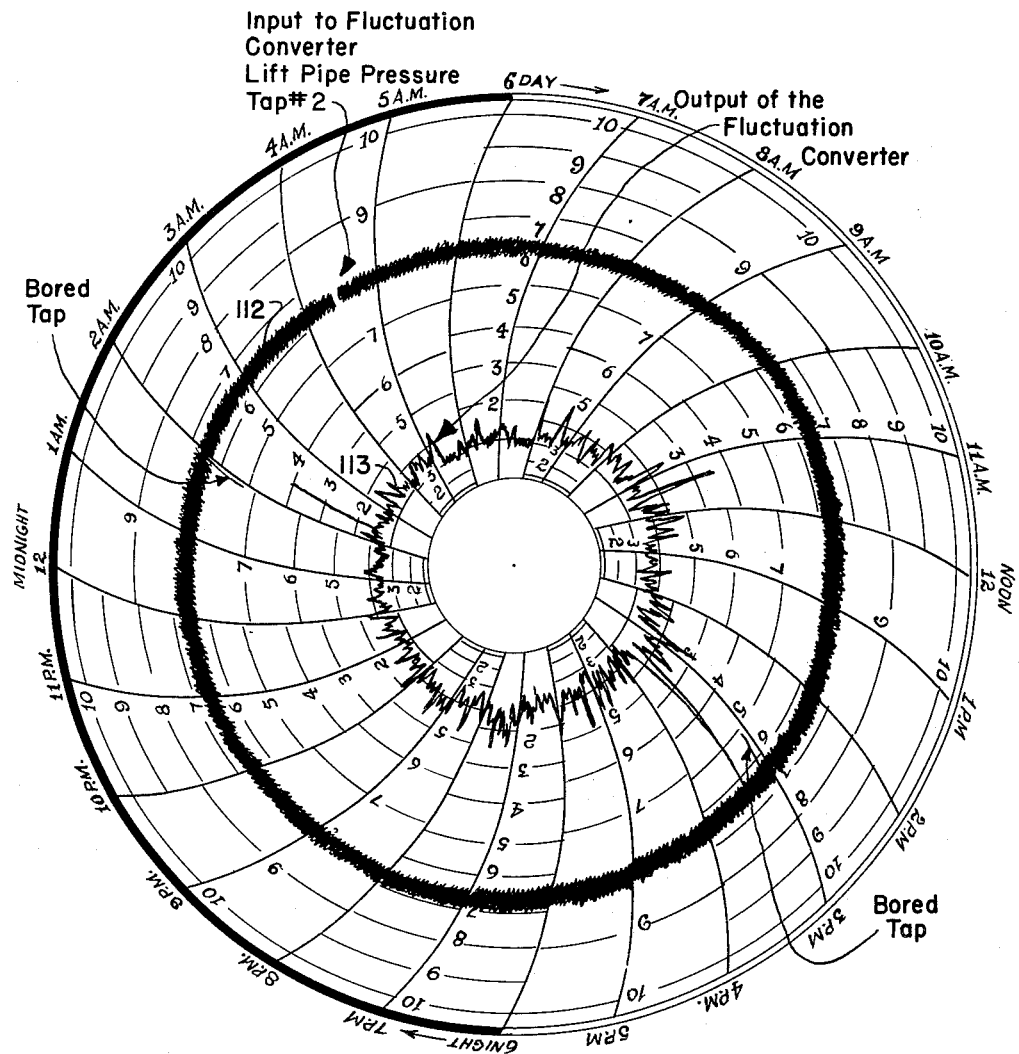
FIGURE 8 is the reproduction of a test recording of the pressure fluctuation in a TCC system and the output fluctuation as indicated by the fluctuation convertor of the invention.

Referring to FIGURE 8, a fluctuation diagram of the pressure in the lift pipe of a commercially operating 15,000 bbl. per day TCC unit, detail 112 shows the pressure fluctuation occurring in the lift pipe, which is used as the input to the fluctuation converter. On the same diagram detail 113 shows the output of the fluctuation converter illustrating the substantially greater magnitude of fluctuation used for control purposes. The smooth reading of the pressure fluctuation detail 112 would indicate no requirement for adjustment whereas the substantial variation in magnitude of the plot 113 indicates that considerable adjustment was necessary for superior lift performance. Of course, the pressure fluctuation occurring in the lift can be converting to any form of electrical signal and this signal can be used to control lift operation. It is preferred, however, that the fluctuation of pressure be converted to a similarly fluctuating voltage which can then be used to control lift operation.

This invention has been disclosed hereinabove for use and control of a pneumatic lift and with respect to the figures provided with the application. It is understood that the invention has broader utility, and alternate uses of the invention are therefore contemplated. The only limitations intended are those found in the attached claims.

I claim:

1. Apparatus for measuring pressure fluctuation magnitude comprising in combination: means for converting pressure fluctuation to a voltage of fluctuating magnitude proportional to the magnitude of pressure fluctuation being measured, a first condenser for retention of maximum voltage, a second condenser for retention of minimum voltage, a unidirectional current controller connected between said first condenser and said voltage of fluctuating magnitude to feed current to said first condenser, a unidirectional current controller connected between said second condenser and said voltage of fluctuating magnitude, to feed current from said second condenser, whereby said first and second condensers act as voltage retaining devices to the maximum and minimum voltage of the voltage of fluctuating magnitude, reistance means connected between said first and second condenser for bleeding minimal current between said condensers, to prevent said condensers from retaining intermittent and unusual peak voltages and means connected between said first and second condensers for reading the voltage between said condensers, said voltage being directly proportional to the magnitude of the pressure fluctuation being measured.

2. Claim 1 further characterized in that the fluctuating voltage is a direct current voltage.

3. Claim 1 further characterized in that the fluctuating voltage is an alternating current voltage.

4. In a pneumatic lift for elevating a granular contact material in a stream of lift gas the improved method of controlling the lift operation which comprises: measuring the fluctuation in pressure in the lift, converting the fluctuation of pressure to a proportional fluctuating electrical voltage, charging the fluctuating voltage to a first condensing zone arranged to retain the maximum voltage of the fluctuating voltage, charging the fluctuating voltage to a second condensing zone arranged to retain the minimum voltage of the fluctuating voltage, transferring a small and restricted flow of current from said first condensing zone to the second condensing zone, applying the voltage differential between the first and second condensing zone to a flow control zone, to control the flow of gas to the lift, so as to retain the voltage differential substantially constant, whereby lift operation is maintained substantially constant at the desired predetermined attrition rate.

5. Improved apparatus for control of the operation of a pneumatic lift elevating a granular contact material in a stream of lift gas which comprises in combination: a lift pressure fluctional converter attached to the pneumatic lift and adapted to convert pressure fluctuation occurring in the lift to a proportional voltage fluctuation, a maximum voltage condenser, means for applying said fluctuating voltage to said maximum voltage condenser, to retain within said condenser the maximum voltage occurring, a minimum voltage condenser, means for applying said fluctuating voltage to said minimum voltage condenser, to retain within said condenser the minimum voltage occurring, means for transferring current from the maximum voltage condenser to the minimum voltage condenser, resistance means located in said means for transferring current, to limit the current transfer between the maximum voltage condenser and the minimum voltage condenser so that the condensers retain a voltage potential between them substantially equal to the instantaneous difference in voltage between the maximum and minimum voltage of the fluctuating voltage, a valve adapted to control the flow rate of lift gas to the pneumatic lift, said valve adapted for operation by an electrical signal, means for applying the voltage differential between the condenser to said valve, to maintain said valve at that predetermined position found necessary to maintain the attrition of the contact material in the pneumatic lift at a predetermined substantially constant level.

6. Claim 5 further characterized in that a voltage amplifier is used to amplify the fluctuation voltage before the voltage is applied to the condensers.

7. Claim 5 further characterized in that the potential difference between the condensers is amplified before the potential difference is applied to the valve.

8. A method for detecting magnitude of variations in a fluctuating variable which comprises generating an input function representative of said variable, applying to a first cumulator values of said function representative of maxima of said variable, applying to a second cumulator values of said function representative of minima of said variable and generating an output function representative of the difference between instantaneous values in said first cumulator and said second cumulator.

9. A system for detecting magnitude of variations in a fluctuating variable comprising source means for providing a function representative of said variable, a first cumulator for storage of said function, a first unidirectional conducting path for transmission of said function from said source means to said first cumulator characterized by low resistance to transmission of said function in the direction recited, a second cumulator for storage of said function, a second unidirectional conducting path for transmission of said function from said second cumulator to said source means characterized by low resistance to transmission of said function in the direction recited, the system being further characterized by communication means of high resistance to transmission of said function between said source means and each of said cumulators, and means connected between said cumulators to detect the difference between the respective values of said function in said cumulators.

10. A system for detecting magnitude of variations in a fluctuating variable comprising source means for providing a function representative of said variable, a first and a second function storage means, conduits between said source means and each of said storage means providing a low resistance transmission path for said function and a high resistance transmission path for said function, control means in one of said conduits providing low resistance paths which control means inhibits transmission of said function from said first function storage means and control means in another of said conduits providing low resistance paths which control means inhibits transmission of said function to said second function storage means, and means connected between said first function storage means and said second function storage means for comparing the respective value of said function in said first function storage means with the value of said function in said second function storage means.

11. In a system for detecting the magnitude of fluctuation in a variable function, means for generation of an input voltage representative of said variable function, first and second capacitors, circuit means adapted to receive said input voltage connected to said first and second capacitors, unidirectional current flow control means located in said circuit means adapted to apply maxima of said input voltage to said first capacitor and to apply minima of said input voltage to said second capacitor, and means connected between said first capacitor and said second capacitor to detect the difference between the charge of said first capacitor and the charge of said second capacitor.

References Cited in the file of this patent

UNITED STATES PATENTS

| | | |
|---|---|---|
| 2,508,478 | Uehling | May 23, 1950 |
| 2,706,962 | Keebon | Apr. 26, 1955 |
| 2,860,174 | Begley | Nov. 11, 1958 |
| 2,929,020 | Mayes | Mar. 15, 1960 |